United States Patent [19]

Regeaud et al.

[11] 4,022,812
[45] May 10, 1977

[54] FIRE RESISTIVE PLASTICIZER AND METHOD

[75] Inventors: Jean-Pierre Regeaud, Boulogne (Seine); Emile Trebillon, Neuilly (Seine); Georges Wetroff, Le Thillay, all of France

[73] Assignee: Rhone-Progil, Paris, France

[22] Filed: June 20, 1974

[21] Appl. No.: 481,039

Related U.S. Application Data

[63] Continuation of Ser. No. 258,491, June 1, 1972, abandoned.

[30] Foreign Application Priority Data

June 10, 1971 France .............................. 71.21052

[52] U.S. Cl. ........................ 260/456 P; 204/162 R; 260/45.7 S; 260/28 R; 260/543 R
[51] Int. Cl.² ......................................... C07C 143/68
[58] Field of Search .................... 260/456 P, 543 R

[56] References Cited

UNITED STATES PATENTS

| 2,174,507 | 9/1939 | Tinker et al. | 260/543 R |
| 2,197,800 | 4/1940 | Henke et al. | 260/543 R |
| 2,412,679 | 12/1946 | Grubb et al. | 260/543 R |
| 2,503,253 | 4/1950 | Ernsberger et al. | 260/543 R |
| 2,610,164 | 9/1952 | Gluesenkamp et al. | 260/456 P |
| 2,689,862 | 9/1954 | Knowles | 260/456 P |
| 2,782,217 | 2/1957 | Dazzi | 260/456 P |
| 3,228,827 | 1/1966 | Larson et al. | 260/456 P |

FOREIGN PATENTS OR APPLICATIONS

| 928,548 | 6/1963 | United Kingdom | 260/456 R |
| 516,214 | 12/1939 | United Kingdom | 260/543 R |

OTHER PUBLICATIONS

Horst, "Modern Plastics," vol. 24, No. 7 (1947), pp. 154, 155, 156, 192 and 194.

*Primary Examiner*—Joseph E. Evans
*Attorney, Agent, or Firm*—McDougall, Hersh & Scott

[57] ABSTRACT

A fire resistive primary plasticizer having 15–70% chlorine, 1–8% sulphur, with the remainder formed principally of carbon, hydrogen and oxygen prepared by the reaction of a substantially straight chain paraffin by the reactions of sulphochlorination, chlorination and condensation with one or more phenolic compounds.

11 Claims, No Drawings

FIRE RESISTIVE PLASTICIZER AND METHOD

This is a continuation of application. Ser. No. 258,491, filed June 1, 1972 now abandoned.

This invention relates to a fire resistive primary plasticizer and to a process for preparation of same.

A process is known for producing chlorinated plasticizers coantaining 3–10% chlorine and 5–10% sulphur. The process involves the sulphochlorination of hydrocarbons and the reaction of the products obtained with phenols. However, such plasticers are not completely satisfactory as plasticizers, particularly because they have disadvantages with regard to color and odor. Moreover, they are not as fire resistive as desired and the cost of production is relatively high because of the requirement to remove and recycle unreacted hydrocarbons.

It is an object of this invention to produce and to provide a method for producing a fire resistive plasticizer which is relatively free of color and odor and which can be produced at relatively low cost.

In accordance with one aspect of the present invention, a fire resistive primary plasticizer is produced having 15–70% by weight chlorine and 1–8% by weight sulphur, the percentages of chlorine and sulphur being adjusted, depending on the properties desired to be obtained, the remainder being principally carbon, hydrogen and oxygen, with the plasticizer being prepared principally from straight chain paraffins and phenolic compounds.

In accordance with another aspect of the present invention, a fire resistive primary plasticizer is produced having 15–70% by weight chlorine, 1–8% by weight sulphur, the remainder being principally carbon, hydrogen and oxygen, in which the plasticizer is prepared substantially entirely from straight chain paraffins and phenolic compounds.

Preferably, the successive operations of sulphochlorination, chlorination and condensation are carried out without isolating the intermediate product formed by each operation.

The operations may be carried out discontinuously as a series of successive steps in a single reaction apparatus or alternatively the operations may be effected as a continuous operation.

In one method of carrying out the process, in accordance with the practice of this invention, a cut of substantially straight chain paraffins containing from 10 to 18 carbon atoms is used. This cut is subjected first to a sulphochlorination operation under irradiation at a temperature within the range of 10°–90° C, by the induction of a sufficient quantity of a gaseous mixture of chlorine and sulphur dioxide having a $Cl_2/SO_2$ molar ratio within the range of 1 to 5 and preferably 1.1 to 1.8; secondly, to a chlorination operation under irradiation at a temperature within the range of 20°–100° C, and thirdly and finally, to a condensation operation with one or more phenols in the presence of a basic reagent. Preferably, an amount within the range of 1 to 1.5 mols of basic reagent per mol of phenol is used and the operation is carried out at a temperature within the range of 0 to 40° C.

In another method of carrying out the process, in accordance with the practice of this invention, a cut of substantially straight chain paraffins containing 10 to 18 carbon atoms is used, and is subjected first to a sulphochlorination operation in the presence of a free radical generating catalyst at a temperature within the range of 10°–90° C, by the induction of a sufficient quantity of a gaseous mixture of chlorine and sulphur dioxide in the molar ratio of $Cl_2/SO_2$ within the range of 1 to 5 and preferably 1.1 to 1.8; secondly, to a chlorination operation in the presence of a free radical generating catalyst at a temperature within the range of 30°–100° C, and thirdly and finally to a condensation operation with one or more phenols in the presence of a basic reagent. Preferably, the third operation is carried out at a temperature within the range of 0°–40° C with the proportion of basic reagent being within the range of 1.0 to 1.5 mols per mol of phenol.

When the free radical generating catalyst is a peroxide, the quantity of peroxide used is within the range of 0.005 to 1% by weight of the paraffin, and the peroxide is preferably sequentially introduced in a number of fractions.

If desired, the operations of sulphochlorination and chlorination may be carried out one under irradiation and the other in the presence of a peroxide catalyst, particularly if the process is carried out in a continuous manner, using a tubular apparatus.

Principally straight chain paraffins having a chain length of 10 to 18 carton atoms are used as starting materials in the process. Such paraffins may be obtained from corresponding petroleum cuts by extraction, using molecular sieves or urea complexes.

The free radical generating catalysts include peroxides and azoic compounds. The peroxides which may be used are those which possess a half-life compatible, on the one hand, with the duration of the operation requiring the presence of the peroxide catalyst and, on the other hand, with the temperature at which the operation is carried out. Representative peroxide catalysts include acetyl-cyclohexyl sulphonyl peroxide (ACSP) and lauroyl peroxide. The azoic compounds which may be used are represented by azobis-isobutyronitrile.

For the condensation operation, the phenols may be selected of mono-phenols and phenols with halogen, alkyl, alkoxy, aryl and carboxylate substituents, such as phenols, chlorophenols, cresols, xylenols, and butyl-phenol.

As used herein, the term "irradiation" is understood to means visible or ultra-violet light, gamma or X-rays.

Apparatus used for carrying out the process of the invention is a conventional apparatus including reservoirs for $SO_2$, $Cl_2$, ammonia and phenol, and the necessary associated flowmeters and piping. Depending upon the particular method of carrying out the process, the apparatus includes a source of irradiation and/or means for the introduction of the catalyst: a reaction vessel, such as a glass laboratory flask, or a stoneware flask for operating on an industrial scale; a gas discharge system with a gas scrubbing system, such as a scrubbing column, and means for emptying the reaction vessel.

The following examples are given by way of illustration, but not by way of limitation, of the process of this invention and of the use of the plasticizers produced with plastic materials. Except where indicated to the contrary, the parts and percentages are given by weight.

EXAMPLE 1

200 g of straight chain paraffins, containing from 10 to 13 carbon atoms, obtained by molecular sieve separation, was introduced into the reaction vessel. Nitrogen purging of the vessel was carried out with heating to 40° C. A stream of chlorine (Cl$_2$) and sulphur dioxide gas (SO$_2$) was bubbled through the paraffin at a flow rate of 2.56 millimoles/minute of Cl$_2$ and 1.64 millimoles/minute of SO$_2$. The paraffin was irradiated with ultra-violet light, and scrubbing columns were brought into service. The flow of the Cl$_2$/SO$_2$ gas mixture was continued for six hours. The labile chlorine (that is the chlorine bound in the SO$_2$Cl groups and easily hydrolyzable in an alkaline medium) present in the product obtained was determined as 210 milliatoms-grams per 100 g. 267.8 g of product was obtained which indicated conversion rates of SO$_2$ and chlorine of 95% and approximately 100% respectively.

Without removing the product from the reaction vessel, a chlorine was passed through at a flow rate of 32 millimoles/minute. This chlorination operation was carried out at 70° C under ultra-violet light irradiation for 90 minutes. The hydrochloric acid formed was entrained by means of a stream of nitrogen at 70° C. 367.8 g of a product was obtained having a chlorine content of 36.9%, which represents a conversion rate of the chlorine of 100% during the course of this second operation.

Into the reaction vessel containing the product resulting from the second operation (chlorination of the sulphochlorinated paraffin) 44.5 g of phenol (an excess of 5) was introduced. The resulting mixture was heated to 40° C, while being agitated. When the phenol had dissolved, the mixture was cooled to 8° C and ammonia gas was passed through at a flow rate of 5.4 millimoles/minute while maintaining the temperature at 8° C, for 70 minutes.

The product of the third operation (condensation with a phenol) was diluted with an equal volume of ether and was scrubbed three times with a 5% soda solution and then with water, until the pH value was 7. The washed product was dried with sodium sulphate and the ether was evaporated. 400 g was obtained of a product (hereinafter referred to as CPSI) containing 29% chlorine and 4.5% sulphur. The conversion rate of the phenol was 95%.

EXAMPLE 2

The method, sequence of operations and the quantities of reactants used were the same as those of Example 1, except that instead of a cut of paraffins containing 10 to 13 carbon atoms use was made of a cut of paraffins containing from 13 to 17 carbon atoms and that ACSP was used as a source of free radicals at a rate of 0.03% relative to the paraffin. The conversion rate of the SO$_2$ was slightly improved to 96.5%.

The final product is hereafter referred to as CPS2.

EXAMPLE 3

The process was carried out as in Example 1, except that the phenol was replaced by 58.2 g of O-cresol. After reaction, 413 g of a final product was obtained. The final product is hereafter referred to as CPS3.

The properties of the products were evaluated as plasticizers with the following results:

The measurements were carried out using a polyvinyl chloride resin PVC, marketed by Rhone-Progil under the trade mark LUCOVYL GS 1200. It is a PVC manufactured by polymerization in suspension and has the following characteristics:

| | |
|---|---|
| Appearance | Small individual beads |
| Granulometry | No retention on an 80 sieve |
| | 70 to 90% retention on a |
| | 150 sieve |
| Apparent volumetric mass | 0.46 to 0.50 |
| K-value | 67–68 |
| Viscosity index | 120 |
| pH of the aqueous extract | 7 |

EXAMPLE 4

Measurement of compatibility with PVC (polyvinyl chloride)

Calculation was made by the FLORY-HUGGINS parameter $\chi$, using a method described in an article by C. E. Anagnostopoulos, A. Y. Coran and H. R. Gamrath, in Modern Plastics 43 (2) 141 - (October 1965).

| Plasticizer | Gelification Temperature °C | Flory-Huggins Parameter $\chi$ |
|---|---|---|
| CPS1 | 117° C | 0.24 |
| CPS2 | 126° C | 0.21 |
| CPS3 | 118° C | 0.23 |

These results show that the products of this invention (reference CPS) should be classed as primary plasticizers, a plasticizer being no longer compatible if its parameter $\chi$ is greater than 0.35–0.45.

EXAMPLE 5

Measurement of volatility

The loss at 180° C was determined, the volatility being represented by the quantity, in per cent, of plasticizer lost. For this measurement, a crystalizer of 5 cm diameter containing 5 g of plasticizer was exposed, in a ventilated hot cabinet, for 30 minutes. It was found that the volatility of CPS1 was 3% and that of CPS2 was 0.5%.

EXAMPLE 6

Measurement of efficiency

The efficiency is the quantity of plasticizer required to be added to 100 g of resin to obtain a plasticized polyvinyl chloride (PVC), having an apparent torsional rigidity modulus of 42 kg/cm$^2$.

The efficiency was determined from the CLASH and BERG curves.

Measurements were carried out on resins plasticized with the products of Examples 1–3, that is CPS1, CPS2, CPS3 and with tricresyl phosphate (TCP) and the plasticizer IGN trichlorethyl phosphate (sold by the Melle Bezons Company). The results obtained are set out in the following table:

| Plasticiser | Efficiency in g |
|---|---|
| CPS 1 | 53 |
| CPS 2 | 60 |
| CPS 3 | 55 |
| TCP | 54 |
| IGN | 76 |

EXAMPLE 7

Measurement of thermal stability

Sheets of stabilized, plasticized PVC were exposed in a hot cabinet at 180° C, and the time of exposure before blacking upon visual examination was recorded.

The estimates were carried out on sheets prepared from PVC plasticized to efficiency. The results of these tests showed that:

CPS 1, CPS 2, and CPS 3 have identical thermal stabilities.

The thermal stability of the products of the invention was comparable with that of tricresyl phosphate.

For improving stability, stabilizers based on tin or barium/cadmium are more effective than those based on lead.

EXAMPLE 8

Thermal properties

The thermal property values, obtained from the characteristic points of the well known CLASH and BERG curves, are listed below.

These characteristic points are the points $T_F$, $T_4$ and $T_E$ corresponding to values of the apparent torsional rigidity modulus of 3150, 233 and 42 kg/cm² respectively. The measurements were carried out on resins plasticized to efficiency.

The results are given in the following table:

| Plasticizer | $T_F$ Point 3150 kg/cm² (° C) | $T_4$ Point 233 kg/cm² (° C) | $T_E$ Point 42 kg/cm² (° C) |
|---|---|---|---|
| CPS 1 | −10.6 | 11.6 | 25.2 |
| CPS 2 | −11.5 | 11.5 | 25 |
| CPS 3 | −15 | 8 | 25 |
| TCP | 1 | 14 | 23.5 |
| IGN | 36 | 50 | 60 |

The CPS plasticizers of the invention exhibit excellent cold behavior in comparison with conventional fire resistant plasticizers.

EXAMPLE 9

Mechanical properties

From test pieces made from resins plasticized to efficiency, the values measured were the 100% modulus (force exerted to obtain an elongation of 100%) and the elongation to rupture.

The results of the tests are given in the following table:

| Plasticizer | 100% modulus in kg/cm² | Elongation at rupture in % |
|---|---|---|
| CPS 1 | 110 | 435 |
| CPS 2 | 103 | 508 |
| CPS 3 | 105 | 483 |
| TCP | 110 | 428 |
| *DOP | 118 | 355 |

*Dioctyl phthalate

The mechanical properties imparted by the platicizers of this invention are superior to those imparted by TCP or DOP.

EXAMPLE 10

Fireproof properties

These properties were determined by the method of J. L. ISAACS, J. FIRE FLAMMABILITY 1, January, 1970, page 36. The oxygen index is the percentage of oxygen in a mixture of oxygen and nitrogen necessary for maintaining combustion conditions in equilibrium. With PVC resin plasticized to efficiency (52–55 g of plasticizer), the values for the oxygen index given in the following table were obtained:

| Plasticizer | Oxygen Index |
|---|---|
| CPS 1 | 34 |
| CPS 2 | 34 |
| CPS 3 | 33 |
| TCP | 27 |
| DOP | 20 |
| Unplasticized PVC | 45 |

It can be seen that the CPS plasticizers of the invention are better than tricesyl phosphate, which is promoted as having advantageous fire resistive properties.

We claim:

1. A process for the production of a fire resistive primary plasticizer containing 15–70% by weight chlorine and 1–8% by weight sulphur comprising subjecting a cut of substantially straight chain paraffins containing from 10 to 18 carbon atoms in succession of separate reactions consisting of a sulfochlorination reaction in which the paraffins are reacted with sulphur dioxide and chlorine in the ratio of 1 mol Cl₂ per 1–5 mols SO₂, a chlorination reaction in which the product of the sulfochlorination step is reacted with chlorine, and a condensation reaction in which the product of the chlorination step is condensed in the presence of a basic reagent with a phenolic compound selected from the group consisting of phenol and substituted phenols wherein the substituent is halogen, alkyl, alkoxy, aryl or carboxylato, with the basic reagent present in the mol ratio of 1–1.5 mols basic reagent per mol of phenolic compound.

2. A process as claimed in claim 1 in which the successive operations of sulphochlorination, chlorination and condensation are carried out without isolating the intermediate products formed by each operation.

3. A process as claimed in claim 1 in which the sulphochlorination, chlorination and condensation operations are carried out discontinuously in succession in one and the same apparatus.

4. A process as claimed in claim 1 in which the sulphochlorination, chlorination and condensation operations are carried out continuously.

5. A process as claimed in claim 1 in which the molar ratio of chlorine and sulphur dioxide is within the range of 1 to 1.8.

6. A process as claimed in claim 1 in which both the sulphochlorination and the chlorination operations are carried out under irradiation.

7. A process as claimed in claim 1 in which sulphochlorination and chlorination operations are carried out in the presence of a free radical generating catalyst.

8. A process as claimed in claim 1 in which one of the two operations of sulphochlorination and chlorination is carried out under irradiation and the other operation is carried out in the presence of a free radical generating catalyst.

9. A process as claimed in claim 7 in which the free radical generating catalyst is a peroxide.

10. A process as claimed in claim 9 in which the quantity of peroxide used is within the range of 0.005 to 1% with respect to the weight of paraffin used.

11. A process as claimed in claim 10 in which the peroxide is introduced in a number of fractions during the course of the operation in which it is used.

* * * * *